Nov. 3, 1953     F. P. SOMOGYI     2,657,789
SHAKER CONVEYER
Filed May 11, 1949     3 Sheets-Sheet 1
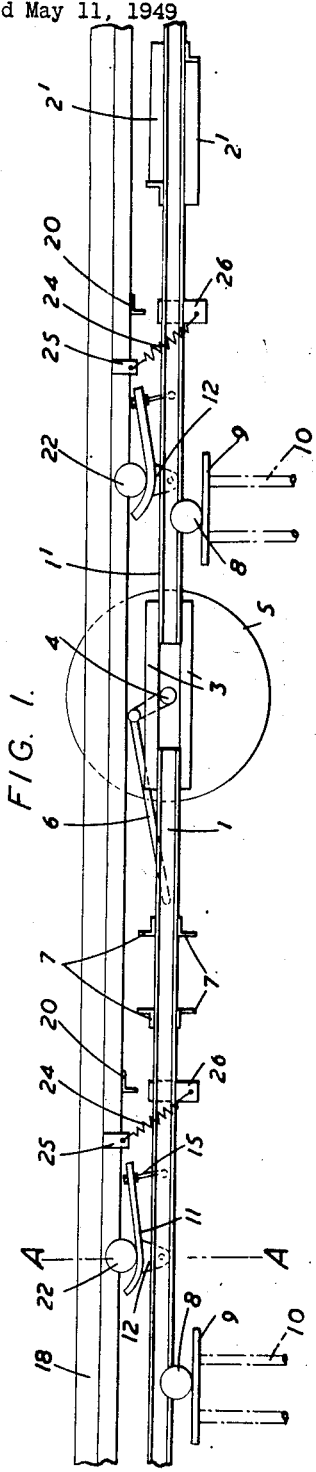
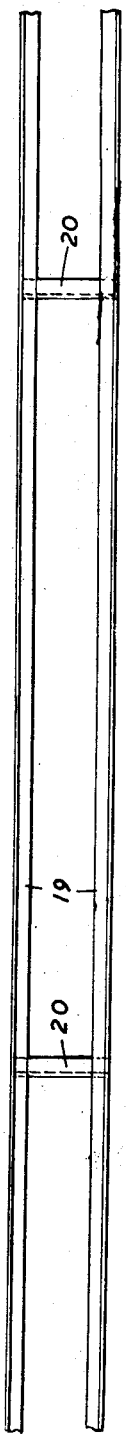
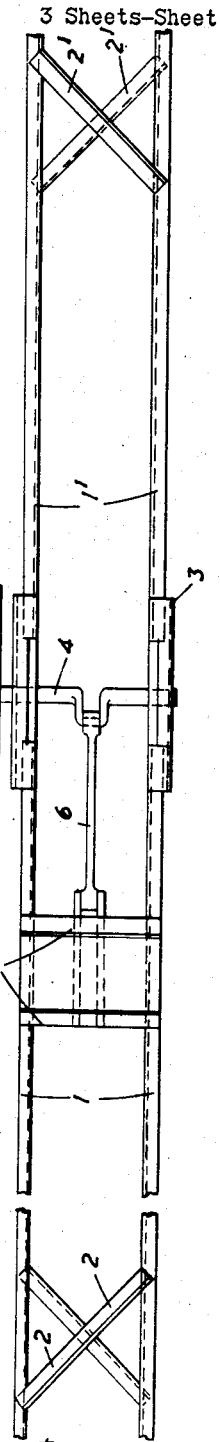
Inventor.
Francis Paul Somogyi.
By Thiess, Olson & Mecklenburger
Attorneys.

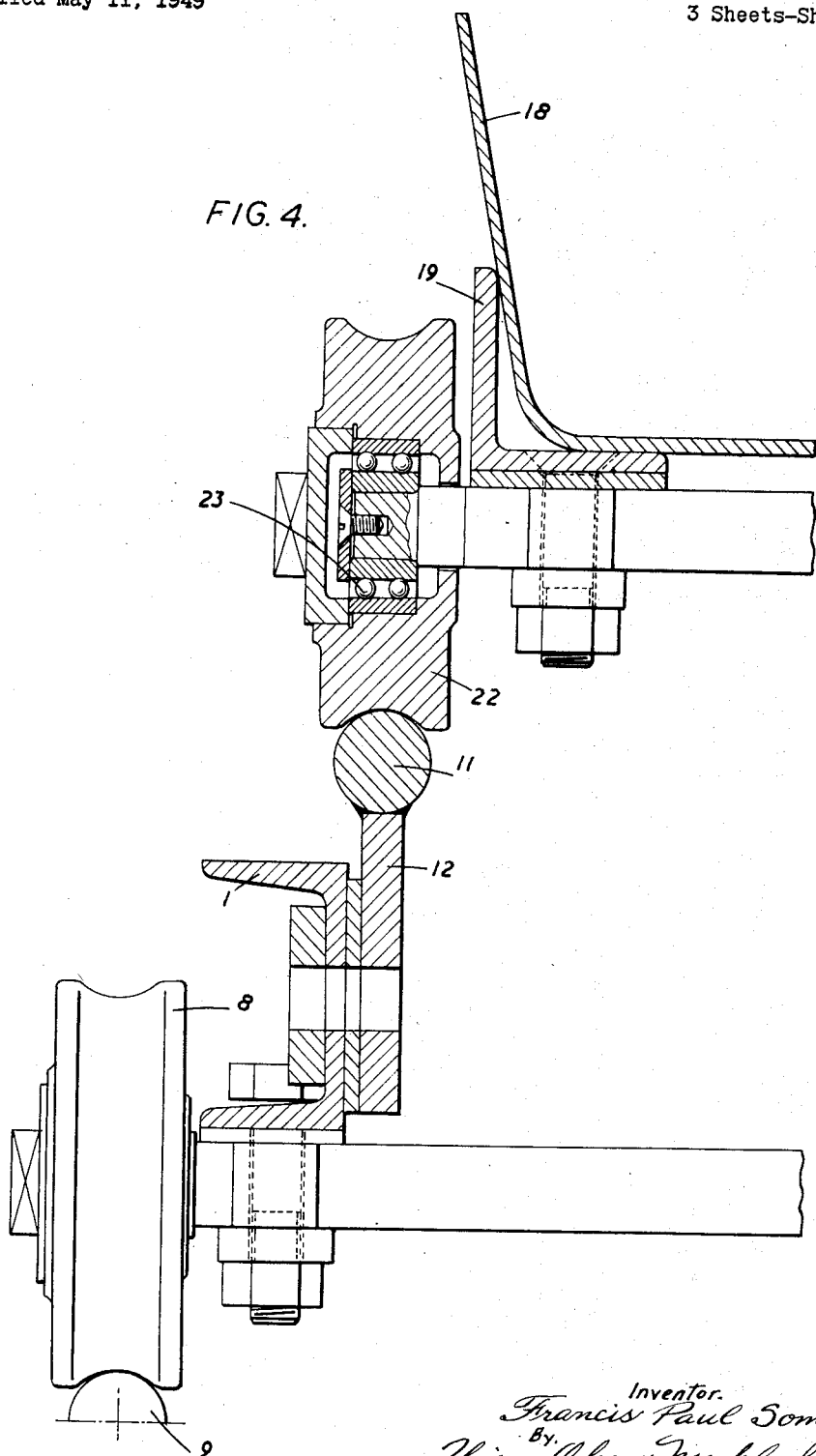

Nov. 3, 1953 F. P. SOMOGYI 2,657,789
SHAKER CONVEYER

Filed May 11, 1949 3 Sheets-Sheet 3

Inventor.
Francis Paul Somogyi
By
Thiess, Olsen & Mecklenburger.
Attorneys.

Patented Nov. 3, 1953

2,657,789

UNITED STATES PATENT OFFICE 2,657,789

SHAKER CONVEYER

Francis Paul Somogyi, London, England

Application May 11, 1949, Serial No. 92,645

5 Claims. (Cl. 198—220)

This invention relates to improvements in or relating to shaker conveyors.

In known shaker conveyors, a trough is given a characteristic motion forwards and backwards, the forward motion of the trough being checked and reversed comparatively abruptly by the action of a restoring force so that material on the trough slides on forwards with respect to the trough, and the backward motion of the trough being checked and reversed comparatively gently by the action of a second restoring force, so that material on the trough moves backwards with respect to the trough relatively little or not at all.

In a known type of shaker conveyor the trough is suspended by cranks from a frame free to roll longitudinally on a supporting structure. The frame is oscillated longitudinally with a substantially simple harmonic motion, and tends to impart a like motion through the cranks to the trough. In order to impart to the trough the necessary characteristic motion, the trough is connected to the supporting structure through a buffer linkage by means of which the necessary restoring force is applied to check and reverse the forward motion of the trough relatively abruptly. The restoring force reacts on the supporting structure, which must therefore be of a substantial nature to withstand the reaction of the restoring force.

According to the invention a shaker conveyor comprises a frame free to oscillate longitudinally, and a longitudinally extending trough carried by the frame and free to oscillate longitudinally with respect to the frame about a position of rest fixed with respect to the frame, the said trough being subject to the action of a restoring force urging it towards the position of rest and reacting on the frame, the said force increasing relatively rapidly as the trough moves forwards of the position of rest and increasing relatively slowly as the trough moves rearwards of the position of rest.

When the frame is oscillated with a substantially simple harmonic motion, characteristic motion of the kind referred to above is imparted to the trough.

It is an advantage of the invention that the frame may be mounted on a support which is not called upon to withstand the reaction of the restoring force, and which may therefore be of less robust construction than heretofore. Thus for example the trough may be mounted on rollers bearing on the tops of comparatively slender pillars or may be mounted on rollers running on rails suspended from a roof.

The restoring force may be derived at least in part from spring means which are stressed when the trough is displaced from the position of rest, the rate at which the stress increases with such displacement being relatively great for displacement forwards of the position of rest and relatively small for displacement rearwards of the position of rest.

The trough may be mounted for oscillation with respect to the frame to-and-fro along a path rising towards its forward end and rear end, the trough being connected to the frame by spring links so arranged that as the trough moves forward from the rear end to the forward end of its path the elongation of the links first progressively decreases, and thereafter increases, and finally exceeds the first-mentioned elongation.

It will be seen that the motion of the trough towards either end of its path is checked and reversed by a restoring force derived partly from gravity and partly from the tension of the spring link. Since the link is elongated to a greater extent towards the forward end than towards the rear end of the path of the trough, the checking and reversal of the forward motion is more abrupt than that of the rearward motion, and in this way the necessary characteristic motion of the trough is produced even when the frame oscillates with substantially simple harmonic motion.

The restoring force necessary to impart the characteristic motion to the trough may be derived at least in part from gravity by arranging the trough to oscillate with respect to the frame along a path rising relatively steeply towards its forward end and relatively gradually towards its rear end.

The frame may be free to roll to and fro along its centre line and may be provided with pairs of cam tracks spaced along its length, one on each side thereof, the cam tracks rising relatively steeply forwards and relatively gradually rearwards from a low point.

The trough is then supported above and parallel to the centre line of the frame by similarly spaced pairs of rollers co-operating with the spaced pairs of cam tracks. The trough is connected to the frame by spaced pairs of parallel tension spring links each extending from a lower anchorage on the frame to an upper anchorage on the trough, the points of anchorage being so chosen that, as the rollers roll from front to rear of the cam tracks, the upper anchorage moves from a point in front of to a point to the rear of the lower anchorage, and that when the rollers are at the low point of the cam tracks, the upper anchorage is in front of the lower anchorage.

The cam tracks may be formed by appropriately contoured shoe members secured to the frame or by appropriately contoured cam grooves formed in the side members of the frame.

Preferably each spring link lies in a vertical longitudinal plane. During the oscillation of the trough with respect to the frame the spring link swings from an extreme forward position in which it is inclined forward at a relatively larger angle to the vertical to an extreme rear position in which it is inclined rearwards at a relatively smaller angle to the vertical.

The forward motion of the trough is then checked and reversed relatively abruptly by the relatively steep forward rise of the path of oscillation, whereas the rearward motion of the trough is checked and reversed relatively gradually by the relatively gradual rearward rise of the path of oscillation, and in this way the necessary characteristic motion is imparted to the trough even when the frame oscillates with substantially simple harmonic motion. Moreover, the abrupt rise and fall at the forward end of the oscillation diminishes or annihilates the frictional resistance to relative motion between the trough and the material conveyed in the trough and thus assists the forward motion of the material.

The trough may be mounted on rollers, which roll on apropriately contoured surfaces supported by the frame. The contoured surfaces may be provided by shoes, cams or cam grooves, the inclination of which may be arranged to be varied at will.

A preferred embodiment of the invention will now be described with reference to the accompanying drawings, in which:

Fig. 1 is a diagrammatic elevation showing a shaker conveyor at rest,

Fig. 2 is a plan showing the supporting structure of the trough,

Fig. 3 is a plan showing the undercarriage frame,

Fig. 4 is a part-section on the line A—A of Figure 1, and

Figure 5:
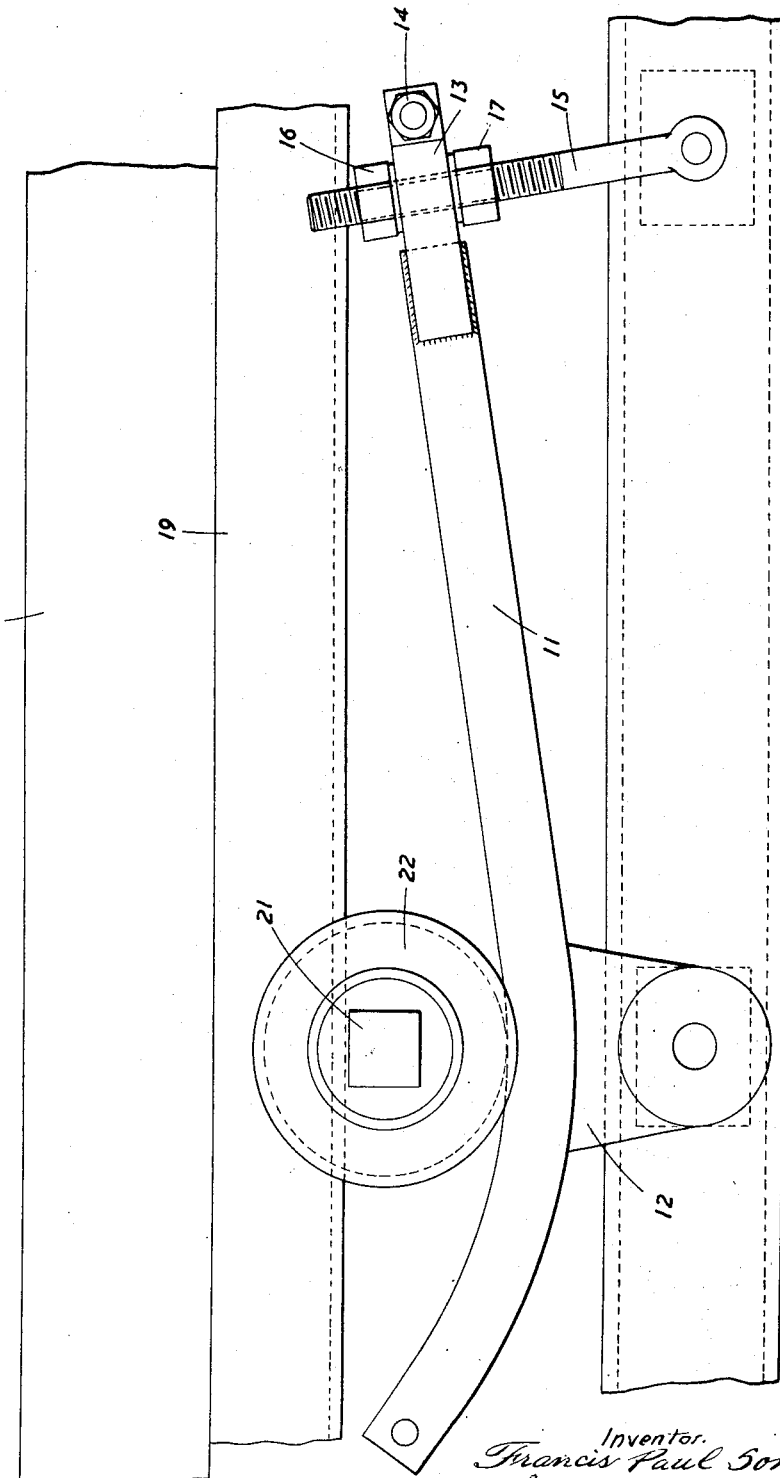
Fig. 5 is an enlarged detail elevation showing the shoe member.

Referring now to Fig. 1, the conveyor has an undercarriage frame formed by pairs of longitudinal channel members 1 and 1', spaced by diagonal angle irons 2 and 2'. The pairs of longitudinals 1 and 1' are spaced by a gap bridged by pairs of angle irons 3. A crank shaft 4 passes through the said gap transversely of the undercarriage frame. The crank shaft 4 carries a flywheel 5 and is linked by a connecting rod 6 to a cross-head formed by cross members 7 connected to the pair of spaced longitudinals 1. The longitudinals 1, 1' of the undercarriage frame are mounted on spaced pairs of wheels 8 which roll on lengths of circular-section rail 9 supported on the top of spaced pillars 10.

Spaced pairs of contoured shoe members 11 are mounted on each longitudinal 1 or 1' at either side of the undercarriage frame. Each shoe member 11 comprises a relatively long straight rear portion and a relatively short forward portion curved upwardly along the arc of a circle.

Referring more particularly to Fig. 5, a lug 12 is provided on the underside of each shoe member 11 adjacent the point of change from the straight to the curved portion and this lug is pivoted to the longitudinal 1 or 1' of the undercarriage frame about a horizontal transverse axis. Spaced plates 13 are welded to the rear of each shoe member 11 and are joined by a screw bolt 14. A screw-threaded link 15, pivoted below to the longitudinal 1 or 1', passes between the plates 13, and nuts 16 and 17 running on the screw-threaded link 15 engage the spaced plates 13 above and below.

A longitudinally extending trough 18 rests on a supporting structure comprising a pair of angle iron side members 19 spaced by transverse angle irons 20. Axles 21 clamped to the underside of the side members 19 carry rollers 22 on ball bearings 23. The rollers 22 rest on the shoe members 11.

Pairs of spring links 24 are anchored above to brackets 25 on the side members 19 and are anchored below to brackets 26 on the longitudinals 1 and 1'.

The connecting rod 6 is relatively long in relation to the throw of the crank shaft 4 and when the latter is driven by means, not shown, the undercarriage frame is caused to oscillate backwards and forwards, i. e. to the right and to the left as viewed in Fig. 1, with a substantially simple harmonic action. The trough 18 participates in the motion of the undercarriage frame, and to this motion there is super-added a relative motion between the trough 18 and the undercarriage frame.

The brackets 25 and 26 are so positioned that, during the oscillation of the trough 18 with respect to the undercarriage frame, the spring links 24 swing from an extreme forward position in which they are inclined forward at a relatively large angle, to an extreme rear position in which they are inclined rearwardly at a relatively smaller angle to the vertical, the elongation of the spring links being greater in the extreme forward position than in the extreme rear position.

It will be apparent that the forward motion of the trough 18 is checked and reversed more abruptly than is the rearward motion since towards the forward end of its path (determined by the motion of the rollers 22 on the shoe members 11) the rise is steeper and the spring links 24 exert a greater force than towards the rear end of its path. Thus the necessary characteristic motion is imparted to the trough 18, although the undercarriage frame itself oscillates with approximation to simple harmonic motion. Material fed on to the trough is therefore conveyed forwards, i. e. from right to left as viewed in Fig. 1.

The relatively steep rise in the forward path of oscillation also assists the forward motion of material carried by the trough 18 as already explained.

By adjustment of the nuts 16 and 17 on the screw-threaded link 15 the inclination of the shoe members 11 may be varied to adjust the path of the trough 18 relative to the undercarriage frame to an optimum for particular operating conditions.

I claim:

1. A shaker conveyor comprising a longitudinally reciprocable frame, means for longitudinally reciprocating said frame forwardly and rearwardly, a conveying trough mounted on said frame and longitudinally movable with respect thereto, said frame having longitudinal rails thereon with their forward ends relatively sharply inclined and their rearward ends relatively gradually inclined, said trough having rollers for riding on said rails, and parallel spring links each extending from a lower anchorage on said frame to an upper anchorage on said trough, said anchorages being so positioned and arranged that as the rollers move from the front to the rear of said tracks the upper anchorage moves from a point in front of to a point to the rear of its cooperating lower anchorage and when the rollers are at the low point of the tracks the upper anchorage is in front of the lower anchorage.

2. A shaker conveyor comprising a longitudinal frame adapted to reciprocate on a stationary base, means for longitudinally reciprocating said frame forwardly and rearwardly, a conveyor trough mounted on said frame and longitudinally reciprocable with respect thereto, means connected to said frame and adapted to provide a position of rest for the trough with respect to the frame and means adapted to brake the inertia-caused movement of the trough relatively rapidly as the trough moves forwardly of the position of rest in the conveying direction and relatively slowly as the trough moves rearwardly of the position of rest.

3. A shaker conveyor comprising a longitudinal frame adapted to reciprocate on a stationary base, means for longitudinally reciprocating said frame forwardly and rearwardly, a conveyor trough mounted on said frame and longitudinally reciprocable with respect thereto, a track mounted longitudinally on the frame being inclined upwards relatively sharply at its forward end and relatively gradually at its rear end, rollers connected to the said trough and adapted to ride on the said track, and means adapted to break the inertia-caused movement of the trough relatively rapidly as the trough moves forwardly of the position of rest in the conveying direction and relatively slowly as the trough moves rearwardly of the position of rest.

4. A shaker conveyor comprising a longitudinal frame adapted to reciprocate on a stationary base, means for longitudinally reciprocating said frame forwardly and rearwardly, a conveyor trough mounted on said frame and longitudinally reciprocable with respect thereto, means connected to said frame and adapted to provide a position of rest for the trough with respect to the frame, and resilient means connected to the trough and to the frame which are so positioned and arranged that they apply a force which tends to move the said trough rearwardly from its forward position faster than when tending to move the said trough forwardly from its rearward position.

5. A shaker conveyor comprising a longitudinal frame adapted to reciprocate on a stationary base, means for longitudinally reciprocating said frame forwardly and rearwardly, a conveyor trough mounted on said frame and longitudinally reciprocable with respect thereto, a track mounted longitudinally on the frame being inclined upwards relatively sharply at its forward end and relatively gradually at its rear end, rollers connected to the said trough and adapted to ride on the said track, and resilient means connected to the trough and to the frame which are so positioned and arranged that they apply a force which tends to move the said trough rearwardly from its forward position faster than when tending to move the said trough forwardly from its rearward position.

FRANCIS PAUL SOMOGYI.

References Cited in the file of this patent

UNITED STATES PATENTS

| Number | Name | Date |
|---|---|---|
| 1,022,332 | Roth | Apr. 2, 1912 |
| 1,492,927 | Krehbiel | May 6, 1924 |
| 2,045,065 | Berrisford | June 23, 1936 |
| 2,332,600 | Rapp | Oct. 26, 1943 |

FOREIGN PATENTS

| Number | Country | Date |
|---|---|---|
| 415,480 | France | July 13, 1910 |
| 518,898 | France | June 1, 1921 |
| 355,795 | Germany | July 3, 1922 |